United States Patent
Sabanovic et al.

(10) Patent No.: US 8,562,091 B2
(45) Date of Patent: Oct. 22, 2013

(54) APPARATUS AND METHOD FOR DETECTING INK IN A RESERVOIR USING AN OVERDRIVEN THERMISTOR AND AN ELECTRICAL CONDUCTOR EXTENDING FROM THE THERMISTOR

(75) Inventors: Mirza Sabanovic, Tigard, OR (US); Marie E. Ottum, Wilsonville, OR (US)

(73) Assignee: Xerox Corporation, Norwalk, CT (US)

( * ) Notice: Subject to any disclaimer, the term of this patent is extended or adjusted under 35 U.S.C. 154(b) by 724 days.

(21) Appl. No.: 12/720,516

(22) Filed: Mar. 9, 2010

(65) Prior Publication Data
US 2011/0221802 A1 Sep. 15, 2011

(51) Int. Cl.
*B41J 2/195* (2006.01)
*B41J 29/393* (2006.01)
*B41J 2/175* (2006.01)

(52) U.S. Cl.
USPC ................................. 347/7; 347/19; 347/88

(58) Field of Classification Search
None
See application file for complete search history.

(56) References Cited

U.S. PATENT DOCUMENTS

| | | | | |
|---|---|---|---|---|
| 2,769,121 A | * | 10/1956 | Rogoff | 361/165 |
| 2,926,299 A | * | 2/1960 | Rogoff | 374/27 |
| 3,110,890 A | * | 11/1963 | Westcott et al. | 340/621 |
| 3,479,875 A | * | 11/1969 | Riddel | 73/295 |
| 3,500,687 A | * | 3/1970 | Smith | 73/295 |
| 3,760,352 A | * | 9/1973 | Marcoux | 340/450.1 |
| 3,846,615 A | * | 11/1974 | Athey et al. | 392/441 |
| 3,896,409 A | * | 7/1975 | Micheli et al. | 338/28 |
| 3,955,416 A | | 5/1976 | Waiwood | |
| 4,001,802 A | | 1/1977 | Fales | |
| 4,058,787 A | * | 11/1977 | Ichikawa et al. | 338/22 R |
| 4,204,186 A | * | 5/1980 | Parisi et al. | 338/30 |
| 4,220,041 A | * | 9/1980 | Potter | 73/61.46 |
| 4,392,782 A | * | 7/1983 | Kuehn et al. | 417/36 |
| 4,416,153 A | | 11/1983 | Williams | |
| 4,476,714 A | * | 10/1984 | Barry et al. | 73/114.57 |
| 4,590,797 A | | 5/1986 | Beaubatie et al. | |
| 4,630,477 A | * | 12/1986 | Murtland, Jr. | 73/295 |
| 4,720,997 A | | 1/1988 | Doak et al. | |
| 4,785,665 A | | 11/1988 | McCulloch | |
| 4,973,993 A | * | 11/1990 | Allen | 347/7 |
| 5,056,363 A | * | 10/1991 | Arekapudi et al. | 73/292 |
| 5,189,438 A | * | 2/1993 | Hine et al. | 347/89 |

(Continued)

FOREIGN PATENT DOCUMENTS

JP 5221002 A 8/1993

*Primary Examiner* — Stephen Meier
*Assistant Examiner* — Leonard S Liang
(74) *Attorney, Agent, or Firm* — Maginot, Moore & Beck, LLP

(57) ABSTRACT

A method detects the level of ink in a print head reservoir by monitoring the power drawn by a thermistor positioned within the print head reservoir by an electrical conductor. The method includes dissipating heat in a thermistor positioned within an ink reservoir, the thermistor having an electrical conductor that extends from the thermistor, a length of the electrical conductor extending through at least a portion of the ink reservoir, providing electrical power through the electrical conductor to the thermistor to maintain the thermistor at a predetermined temperature that is a fixed differential above a temperature of the ink reservoir, measuring a parameter that corresponds to the heat dissipated from the thermistor and the length of the electrical conductor extending through the portion of the ink reservoir, and correlating the measured parameter to a predetermined value corresponding to an ink level in the ink reservoir to detect a position of the ink level in the reservoir continuously along the length of the electrical conductor and the thermistor.

18 Claims, 5 Drawing Sheets

(56) References Cited

U.S. PATENT DOCUMENTS

| | | | | |
|---|---|---|---|---|
| 5,253,521 A | * | 10/1993 | Abramovich et al. | 73/306 |
| 5,276,468 A | * | 1/1994 | Deur et al. | 347/17 |
| 5,302,934 A | * | 4/1994 | Hart et al. | 338/22 R |
| 5,386,224 A | * | 1/1995 | Deur et al. | 347/7 |
| 5,671,603 A | * | 9/1997 | McCorkle et al. | 62/49.2 |
| 5,910,189 A | * | 6/1999 | Suzuki et al. | 73/295 |
| 5,920,332 A | * | 7/1999 | Brooks | 347/85 |
| 5,929,754 A | | 7/1999 | Park et al. | |
| 5,956,061 A | * | 9/1999 | Ahn | 347/87 |
| 6,007,173 A | * | 12/1999 | DeLouise et al. | 347/7 |
| 6,059,406 A | | 5/2000 | Richtsmeier et al. | |
| 6,202,486 B1 | | 3/2001 | Kemp | |
| 6,662,650 B1 | | 12/2003 | Durkee et al. | |
| 6,802,585 B1 | * | 10/2004 | Wratchford | 347/17 |
| 7,060,949 B1 | * | 6/2006 | Davis et al. | 219/536 |
| 7,181,965 B2 | | 2/2007 | Kearney et al. | |
| 7,556,326 B2 | * | 7/2009 | Knierim et al. | 347/7 |
| 7,596,998 B2 | | 10/2009 | Zimmermann et al. | |
| 8,024,968 B2 | * | 9/2011 | Sabanovic et al. | 73/290 R |
| 8,065,913 B2 | * | 11/2011 | McCracken et al. | 73/304 R |
| 2005/0140713 A1 | * | 6/2005 | Godil et al. | 347/17 |
| 2005/0146546 A1 | * | 7/2005 | Godil et al. | 347/17 |
| 2005/0207473 A1 | * | 9/2005 | Philip et al. | 374/185 |
| 2006/0042375 A1 | * | 3/2006 | Davis | 73/295 |
| 2006/0080052 A1 | | 4/2006 | Smith et al. | |
| 2007/0076023 A1 | * | 4/2007 | Knierim et al. | 347/7 |
| 2009/0027477 A1 | * | 1/2009 | Matsuo et al. | 347/211 |
| 2010/0077855 A1 | * | 4/2010 | McCracken et al. | 73/304 R |
| 2010/0192685 A1 | * | 8/2010 | Sabanovic et al. | 73/290 R |

\* cited by examiner

APPARATUS AND METHOD FOR DETECTING INK IN A RESERVOIR USING AN OVERDRIVEN THERMISTOR AND AN ELECTRICAL CONDUCTOR EXTENDING FROM THE THERMISTOR

TECHNICAL FIELD

The apparatus and method described below relates to detecting the level of ink remaining in a printer, and more particularly to using thermistors to detect the level of ink in a print head reservoir.

BACKGROUND

Inkjet printers eject or "jet" small bursts of liquid ink from extremely fine nozzles to form an image on an image receiving surface, such as an intermediate transfer surface, or a media substrate, such as paper. The benefits of inkjet printing include low printing noise, low cost per printed page, and the ability to print "full color" images. Full color inkjet printers often utilize a print head having four ink reservoirs, one for each color required to generate full color images; namely, cyan, magenta, yellow, and black.

Full color and monochromatic inkjet printers can be divided into two categories based on the properties of the ink ejected from the print head. Aqueous inkjet printers utilize inks formed from a water soluble dye suspended in a polyhydric alcohol. Due to the alcohol base, aqueous inks remain in a liquid phase at room temperature. Therefore, aqueous inks are suitable for printing anytime the user activates the printer. Alternatively, phase change inkjet printers utilize ink that remains in a solid phase at room temperature, often having a waxy consistency. Before the solid ink print head may eject phase change ink, the print head must warm the ink to an operating temperature. As the ink reaches operating temperature it melts, or changes phase, allowing the ink to achieve a liquid consistency suitable for ejection by the print head. The printer maintains at least a portion of the ink at an operating temperature while the printer is activated; however, when the printer is deactivated the ink begins to cool, eventually returning to the solid phase. Before the printer may print an image, the print head must again melt at least a portion of the ink.

Inkjet printers, including phase change or solid ink printers, may include a print head having a comparatively small ink reservoir fluidly connected to a larger main ink reservoir. Each main ink reservoir houses a quantity of liquid ink. The printer contains circuitry that doses portions of the ink in the main reservoir to the print head reservoir. A two-stage reservoir system reduces the mass of the print head, thereby conserving energy and increasing print speed. Additionally, systems utilizing solid ink benefit further because, the small ink reservoir on the print head avoids the necessity of continually applying nominal thermal control to the entire supply of solid ink in the main reservoir for every print job. However, two-stage reservoir systems require the printer to monitor the quantity of ink within the print head reservoir closely, because if the print head completely drains the reservoir during the imaging process, the desired image will not be properly formed. This monitoring is also required for single reservoir systems where the reservoir capacity is small for thermal efficiency.

Various methods exist to monitor the supply of ink in the print head reservoir. One method counts the number of ink drops ejected by the print head nozzle. Ink drop counting works well for theoretical ink volume tracking and provides the printer's electronic controller with a continuously variable ink level signal; however, the system does not provide real-time monitoring of the actual level of ink in the print head and may become increasingly inaccurate with repetitious printing. Ink drop counting is also difficult to track accurately as the amount of ink added to the reservoir cannot always be precisely measured. Consequently, the error differential in the inflow and outflow of ink can accumulate over time. Another method utilizes a pair of electrodes immersed within the print head reservoir. Circuitry monitors the electrical resistance of the ink, and as the ink level changes, so does the resistance measured across the electrodes. Ink resistance monitoring also works well, but only when the printer utilizes an ink with a consistent and measurable conductivity. Optimal control over reservoir volume suffers from an inability to determine existing ink volume in a reservoir accurately and to quantify an ink volume change precisely during both printing and ink replenishment. Identifying an ink volume change is particularly difficult to achieve while simultaneously printing and replenishing. Therefore, further developments in the area of ink level sensing are desirable.

SUMMARY

A new method for detecting the level of ink in a print head reservoir monitors the power dissipated by a thermistor having an electrical conductor extending from the thermistor within the print head reservoir. The method includes dissipating heat in a thermistor positioned within an ink reservoir, the thermistor having an electrical conductor that extends from the thermistor, a length of the electrical conductor extending through at least a portion of the ink reservoir, providing electrical power through the electrical conductor to the thermistor to maintain the thermistor at a predetermined temperature that is a fixed differential above a temperature of the ink reservoir, measuring a parameter that corresponds to the heat dissipated from the thermistor and the length of the electrical conductor extending through the portion of the ink reservoir, and correlating the measured parameter to a predetermined value corresponding to an ink level in the ink reservoir to detect a position of the ink level in the reservoir continuously along the length of the electrical conductor and the thermistor.

A system may be implemented in a printer that detects ink in a print head reservoir by monitoring the power dissipated by a thermistor having an electrical conductor that extends from the thermistor and positions the thermistor within the print head reservoir. An ink level detection system may utilize the method to facilitate detecting the level of ink in a print head reservoir. The ink level detection system includes a thermistor positioned with an electrical conductor within an ink reservoir of a printer, the electrical conductor being thermally exposed within the ink reservoir to enable the electrical conductor to dissipate heat into the ink reservoir, a switch configured to couple a voltage to the thermistor through the thermally exposed electrical conductor in response to a control signal being received at the switch, a comparator having one input coupled to a voltage across the thermistor and another input coupled to a threshold voltage, the comparator generating the control signal received by the switch, and a digital controller coupled to the comparator and configured to measure a parameter corresponding to a dissipation of heat from the thermistor and the thermally exposed electrical conductor during a predetermined time period and to correlate the measured parameter to a predetermined value that corresponds to an ink level in the ink reservoir to detect a position of the ink level continuously along a length of the thermally exposed electrical conductor and the thermistor.

A thermistor probe has been developed to enable a thermally conductive fluid level to be monitored continuously along a range from empty to full. The thermistor probe includes a probe body, an electrical conductor extending from the probe body, and a thermistor electrically connected to the electrical conductor, the electrical conductor and the electrical conductor being external to the probe body to enable the thermistor and the electrical conductor to dissipate heat into a reservoir in which at least a portion of the electrical conductor and thermistor are positioned.

DETAILED DESCRIPTION

Figure 1:
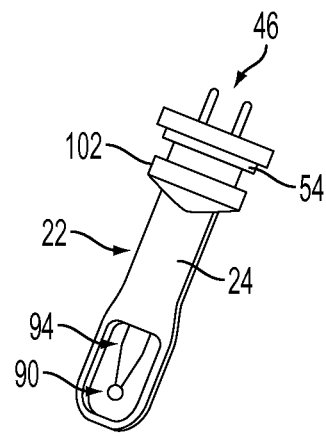
FIG. 1 depicts a perspective view of a thermistor probe.

The word "printer" as used herein encompasses any apparatus, such as a digital copier, bookmaking machine, facsimile machine, multi-function machine, etc. which performs a print outputting function for any purpose. While the specification focuses on a system that detects the level of molten solid ink in a solid ink print head, the method and apparatus for detecting ink in a reservoir may be used with any device that detects a level of thermally conductive fluid. Furthermore, solid ink may be called or referred to herein as ink, ink sticks, or sticks and the method of determining the reservoir ink level is applicable to any consistency or composition of ink that may not be solid at room temperature, such as aqueous or UV curable inks.

As used in this document, thermistor refers to a ceramic, polymer, or other material that has a positive or negative temperature coefficient. The electrical resistance of this material changes as the temperature of the material changes. If the thermistor has a negative temperature coefficient, the resistance of the thermistor material decreases as the temperature of the material increases. Alternatively, when the temperature of such a thermistor decreases, the resistance of the material increases. The reverse resistance/temperature relationships are true for material having a positive temperature coefficient. A thermistor is typically encapsulated within a thermal conductive material, such as glass or the like, and coupled to a current or voltage source by an electrical conductor. Typically, the electrical conductor is constructed as a pair of electrical leads that extend from the thermistor to enable the thermistor to be electrically coupled or connected to an electrical circuit. In previously known ink level monitoring systems, a thermistor within an ink reservoir was electrically overdriven to raise its temperature to a predetermined value above the ambient temperature of the ink in the reservoir. Because the thermal conductive properties of air and ink are significantly different, a thermistor partially or completely submerged in melted ink would lose heat and drop in temperature more quickly than a thermistor substantially surrounded by air. By decoupling electrical power from the thermistor for a fixed period of time and then measuring a parameter related to the effective "dissipation" of electrical power in the thermistor as the thermistor was electrically overdriven to return the thermistor to the predetermined temperature, the controller electrically coupled to the thermistor was able to detect whether the thermistor was in contact with ink in the reservoir or not as well as the amount of "coverage" by ink, that is, the area of the thermistor body and thermistor leads covered by ink. Monitoring the electrical power used to generate a degree of thermal energy with reference to an overdriven thermistor enables a controller to determine whether the ink level in a reservoir reached at least to the thermistor. In the system described below, the electrical conductor extending from the thermistor is thermally exposed to the volume of the ink reservoir that can contain ink. The electrical conductor operates as a conduit effectively coupling the thermistor thermally to the heat sinking properties of the melted ink when the conductor is within the melted ink. This thermal coupling of the electrical conductor and thermal body affects the heat loss experienced by the thermistor. Electrical power consumption or dissipation is hereby defined as referring to the process of providing some quantity of electrical power to the thermistor that is converted to thermal energy and then dissipating some quantity of that thermal energy through a fluid heat sink that varies in effectiveness with reference to the degree or level of immersion of the functional mass of the thermistor and electrical conductor unit. Thus, the measurement of the electrical power dissipated by the thermistor is affected by the level of the melted ink on the electrical conductor. The change in dissipated electrical power, even those changes occurring in response to ink level fluctuations on different positions of the electrical conductor alone, are sufficient to indicate the amount of ink level change in the reservoir. Thus, the system described below indicates a range of ink levels that may be perceived as corresponding to a range extending from an empty level to a full level. Consequently, the system described below is able to detect full ink levels as well as empty or low ink levels and the ink levels between these two extremes. This range of ink level sensing enables the controller to replenish ink in the reservoir in a manner that is more likely to prevent reservoir exhaustion and reservoir overflow.

As illustrated in FIG. 1, a thermistor probe 22 includes a probe body 24, a thermistor 90, an electrical conductor 94, mounting flanges 54 and 102, and electrodes 46. The mounting flanges 54 and 102 are used to secure the probe to a printhead 38 (FIG. 2) so the portion of the probe body 24 holding the thermistor 90 extends into the ink reservoir 58 (FIG. 2), as well as to house the o-ring (not illustrated) which provides an air-tight seal. The probe body 24 is opened to expose a thermistor bead 90 and the electrical conductor 94 extending from the thermistor 90. The conductor 94 may be described as a pair of electrical leads that are separated from one another for reasons explained below. The each one of the leads is electrically connected to one of the electrodes 46 to provide a continuous electrical circuit path from one electrode, through one of the leads of conductor 94, thermistor 90, the other lead of the conductor 94, and out through the other electrode. The probe body 24 is formed from materials capable of remaining rigid at temperatures in excess of the print head 38 operating temperature, which may exceed 115° C. Suitable materials include, but are not limited to, polyimide. The probe body, as shown, may also include an opening that is at least partially surrounded by a member to reduce the likelihood that the thermistor and/or the electrical conductor is bent or otherwise damaged during handling, such as during installation. Although the member is shown as being generally O-shaped in the figure, the member may be C-shaped or some other configuration adapted to protect the thermistor and exposed electrical conductor.

Figure 2:
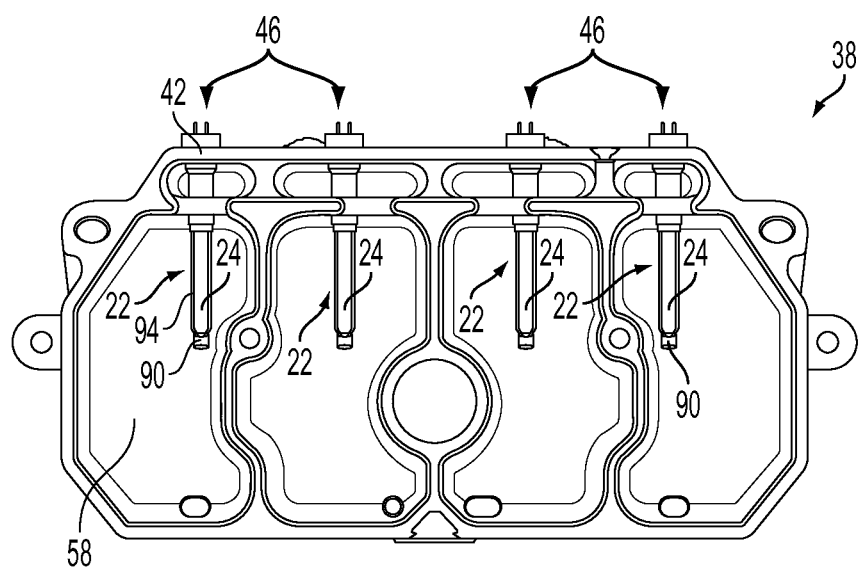
FIG. 2 depicts a print head having four ink reservoirs, each of which has a thermistor probe of FIG. 1.

FIG. 2 illustrates a vertical cross section of a solid ink print head 38 that is designed to print full color images. The print head 38 includes a plurality of ink reservoirs 58 with each reservoir having an ink reservoir opening 42 in which a thermistor probe 22 has been mounted. Each reservoir 58 is connected to a main reservoir (not illustrated) through a fill tube (not illustrated). A reference thermistor (not shown) is secured proximate each ink reservoir to provide an indication of the ink reservoir ambient temperature to a controller. The reference thermistor is surrounded by structure that prevents ambient air from impacting the temperature reading obtained by the reference thermistor. Each opening 42 is configured to engage the base of a probe 22. The electrodes 46 enable a circuit board or boards upon which the ink level monitoring components are mounted to be coupled electrically to the thermistors in the probes 22. The print head 38 also includes a heating element (not illustrated) that maintains the temperature of the print head 38 at a relatively constant operating temperature. The operating temperature exceeds the temperature required to melt the solid ink contained in each reservoir 58.

In the embodiment shown in FIG. 2, a "full" level corresponds to an upper surface of an ink level in the reservoir approaching the position where the conductor 94 emerges from the probe body 24. An "out" level is sensed when the thermistor bead 90 no longer contacts melted ink in a reservoir 58. A "low" condition can be defined at any reasonable point above this level. Thus, the thermistor beads 90 and a portion of the exposed leads 94 may at times be submerged in the ink, and at other times may be surrounded by an air pocket above the upper surface of the ink. The length of the conductor 94 provides a range between full and empty in which the ink level may be sensed and monitored as explained below. In one embodiment, the length for the conductor 94 is approximately 8 mm, although other lengths may be used depending upon the type of thermistor and conductor used as well as the temperature offset to which the thermistor is driven.

Figure 3:
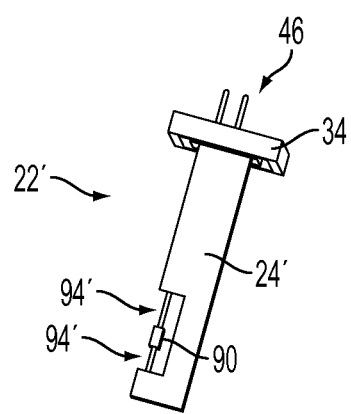
FIG. 3 depicts an alternate embodiment of a thermistor probe.

An alternative embodiment of a thermistor probe 22' is illustrated in FIG. 3. That embodiment includes a thermistor body 24', a mounting flange 34, electrodes 46, electrical conductor 94', and thermistor 90. The electrical conductor 94' is arranged axially with respect to thermistor 90. One end of conductor 94' is electrically connected to one electrode 46 while the other end of conductor 94' is electrically connected to the other electrode 46. In this configuration, the length of the electrical conductor 94' and the thermistor 90 in the U-shaped opening of the thermistor body 24' provides the length over which the ink level can be determined with reference to the electrical power dissipated by the thermistor 90. This configuration allows each conductor 94' to contribute individually to sensing the range of ink levels thus extending along the continuous functional length.

The probe body 24, 24' should be manufactured of a material that does not become excessively malleable when subject to the operating temperature of the print head 38. Suitable probe body materials include, but are not limited to, polysulfone. As illustrated in FIG. 1, the probe 22 may have an opening surrounded by a portion of the probe body 24 or, as shown in FIG. 3, the probe may have a U-shaped opening, although other probe 22 configurations are possible.

The thermistor 90 includes a glass bead or other thermal conductive encapsulating material. As noted above, the thermistor 90 includes a ceramic, polymer, or other material that changes electrical resistance in response to a change in temperature. The electrical conductor 94 extends from the thermistor 90 to connect the thermistor 90 to the electrodes 46, which electrically coupled the thermistor 90 to the ink level circuit 150 (shown in FIG. 4). In phase change ink printers, the conductor 94 may be coated with a thin layer of non-stick polymer, such as polytetrafluoroethylene (commonly referred to as PTFE and sold commercially as Teflon®). The coating helps prevent the liquid ink within the reservoir from corroding the leads. Additionally, the non-stick properties of PTFE help keep the leads from wicking ink up the leads and reduce the adhesion of ink to the leads. As explained below, these properties help ensure the accuracy of the liquid levels obtained from the thermistor and electrical conductor when they are submerged in liquid ink.

In the embodiment described herein, the material within the thermistor 90 has a negative temperature coefficient. Therefore, when the temperature of the thermistor 34 increases, the resistance of the material within the bead 90 decreases. Alternatively, when the temperature of the thermistor 34 decreases, the resistance of the material within the bead 90 increases. Although the method and system described below utilize a thermistor having a negative temperature coefficient, the system and method may also be configured for use with a thermistor having a positive temperature coefficient.

The thermistor 90 and the electrical conductor 94 extending from the thermistor are exposed to the ink within the reservoir 58. Consequently, the orientation of the probe 22 determines the position of the thermistor 90 within the ink reservoir 58. As illustrated in FIG. 2, the probe 22 may be vertically positioned within the ink reservoir 58, such that the length of the probe 22 determines the position of the thermistor 90 within the reservoir 58. When the upper surface of the ink drops below the thermistor 90 the ink level detection system indicates an ink out level. Thus, the length of the conductor 94 is configured to position the thermistor 90 in the reservoir at a location where the ink level appropriately indicates one end of an appropriate range of ink level conditions in the reservoir. The conductor 94 and probe body 24 may have a length that positions the thermistor at a location that signals a low ink condition before the reservoir 58 reaches a state defined as empty in order to give an ink delivery system enough time to replenish the reservoir 58 before the ink is completely drained or reaches a level below which it cannot be allowed to go. As discussed below, the electrical conductor extends the range in which the ink level may be monitored. That is, the thermal conductive properties of the electrical conductor affect the heat loss in the thermistor and the measurement of the parameter related to the dissipation of electrical power in the thermistor. Cross sectional areas of electrical conductors typically used in electronic applications are adequate to provide this function in most ink level monitoring applications, but the performance of the ink level monitoring system may be fine tuned to a given application. Fine tuning may be achieved by utilizing different cross section shapes and even varying the electrical conductor in size, mass, or shape over all or portions of the length exposed within the immersion range. Also, the electrical conductor material and the thermal conductivity properties of the material as well as the coating material and the thermal conductivity properties of that coating material can be used to fine tune the ink level monitoring system. In one embodiment described herein, the electrical conductors are made from an iron-nickel alloy, although other metals and alloys may be used, and coated with PTFE, although other materials may be suitable for a coating. Also, other probe orientations may be used within an ink reservoir or more than one probe may be used in an ink reservoir. For example, one probe may be mounted to extend into the reservoir from an upper end of the reservoir and another probe may be mounted to extend into the reservoir from a lower end of the reservoir. This configuration enables incremental level monitoring at the full and at the empty ends of the reservoir. Also, probes may be arranged serially to extend the range of ink level monitoring. That is, two probes may be mounted to the upper end of the reservoir, but one probe has a longer solid probe body that positions the exposed conductor 94 and thermistor 90 below the exposed conductor and thermistor of the shorter probe.

Figure 4:
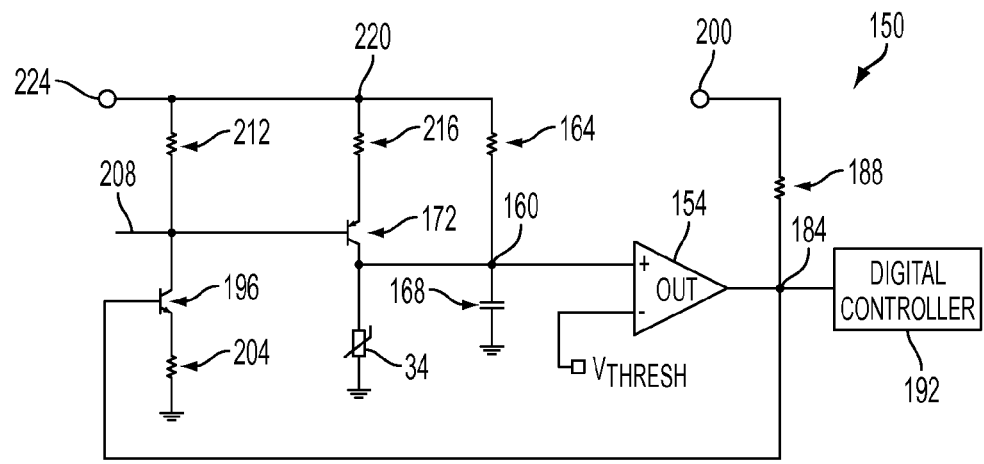
FIG. 4 depicts a schematic view of a circuit for detecting the ink level in an ink reservoir.

FIG. 4 shows an electronic circuit 150 for detecting the level of ink in a print head reservoir 58 using the thermistor probe 22 described above. The circuit 150 includes an open-collector comparator 154 having a first input coupled to programmable threshold voltage level $V_{thresh}$. The second input of the comparator 154 is coupled to node 160, which shares a connection with a first resistor 164, a capacitor 168, the collector of a PNP bipolar junction transistor 172, and a thermistor 34 having a negative temperature coefficient, which may be implemented by the thermistor 90 in the probes described above. The capacitor 168 and the thermistor 34 are also connected to electrical ground. Likewise, the open collector output of the comparator 154 is coupled to node 184, which shares a connection with a second resistor 188, an input/output lead of a digital controller 192, and the base of an NPN bipolar junction transistor 196. The second resistor 188 is coupled to a control voltage, provided as a positive logic supply voltage 200. The emitter of the NPN transistor 196 is connected to a third resistor 204, which is coupled to ground. The collector of the NPN transistor 196 is coupled to node 208, which shares a connection with a fourth resistor 212 and the base of the PNP transistor 172. The emitter of the PNP transistor 172 is connected to a fifth resistor 216. The fifth resistor 216 is coupled to node 220, which shares a connection with the first resistor 164, the fourth resistor 212, and a positive supply voltage 224 of, for example, twelve volts. Furthermore, the fifth resistor 216 has a comparatively low resistance when compared to the resistance of resistor 164.

The ink level thermistor 34 of circuit 150 is utilized in a "self heat" configuration. Of course, the thermistor 34 does not actually heat itself; rather, a heating voltage driven from supply voltage 224 through the comparatively low resistance of resistor 216, transistor 172, and across the resistance of the thermistor 34, heats the thermistor 34. Specifically, application of a twelve volt supply voltage 224 with resistor 216 having a resistance of 100 ohms produces a heating voltage of approximately eleven volts across thermistor 34. Once thermistor 34 reaches a steady state threshold temperature, the heating voltage of eleven volts may generate a current of 7.5 milliamps through thermistor 34 in the circuit depicted in FIG. 4. Thus, unlike the reference thermistor for the reservoir in which the thermistor 34 is positioned, the temperature of the ink level thermistor 34 generally becomes greater than the temperature of the surrounding environment. Specifically, the ink level thermistor 34 is self heated to a threshold temperature, which equals a predetermined temperature differential plus the operating temperature of the print head reservoir 58. In one embodiment, a temperature differential of 32° C. is utilized, although other temperature differentials work sufficiently well. The threshold temperature is controlled by a corresponding threshold voltage $V_{thresh}$.

Figure 5:
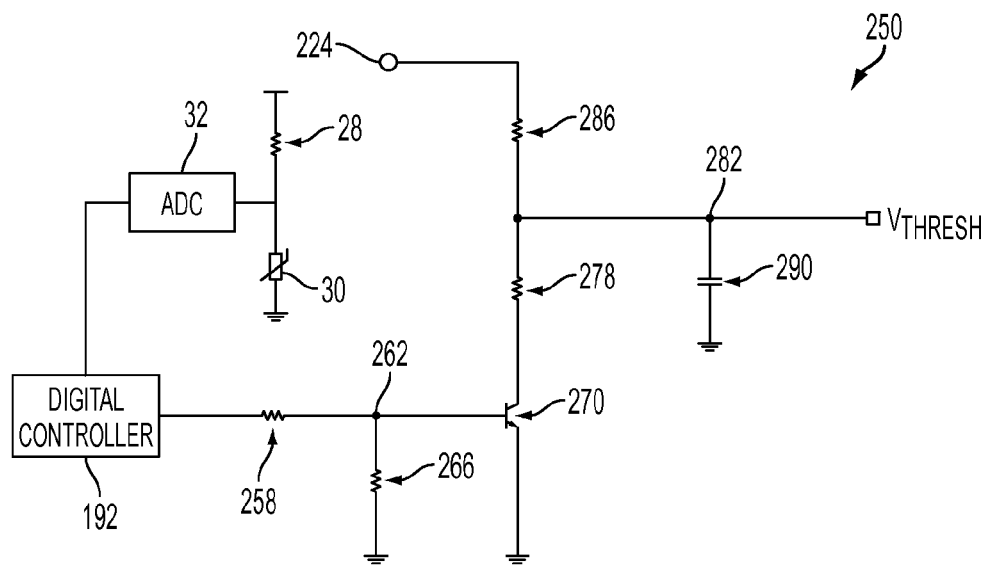
FIG. 5 depicts a schematic view of a circuit for generating a threshold voltage.

FIG. 5 shows a circuit 250 for generating the programmable threshold voltage $V_{thresh}$. Reference thermistor 30 is connected on one side to ground and on the other side to a pull-up resistor or current source 28. An input of analog to digital converter (ADC) 32 is coupled to the thermistor 30 and its output is coupled to an input lead of the digital controller 192, which may be provided as a microprocessor or a complex programmable logic device. An output lead of the digital controller 192 is connected to a first resistor 258. The first resistor 258 is connected to node 262, which shares a connection with a second resistor 266 and the base of an NPN bipolar junction transistor 270. The second resistor 266 and the emitter of the transistor 270 are connected to ground. The collector of the transistor 270 is connected to a third resistor 278. The third resistor 278 is connected to a node 282, which shares a connection with a fourth resistor 286 and a capacitor 290. The fourth resistor 286 is connected to the positive supply voltage 224, which may be +12 volts, and the capacitor 290 is connected to ground. The threshold voltage $V_{thresh}$ is the voltage generated at node 282.

The circuit 250 of FIG. 5 implements a method for generating the threshold voltage $V_{thresh}$. As mentioned above, the threshold voltage $V_{thresh}$ is a voltage level that represents the temperature of the print head 38 plus a predetermined temperature differential. When determining the threshold voltage $V_{thresh}$, the digital controller 192 monitors the voltage dropped across the resistance of the reference thermistor 30. Then, the digital controller 192 converts the monitored voltage drop to a reservoir temperature and adds the predetermined temperature differential to the converted reservoir temperature to arrive at the threshold temperature. Next, the digital controller 192 converts the threshold temperature to a corresponding threshold voltage $V_{thresh}$. Finally, the digital controller 192 generates a pulse width modulated ("PWM") voltage signal, which is applied to the base of transistor 270. By varying the duty cycle of the PWM signal, the digital controller 192 controls the current flow through transistor 270. The current through transistor 270 generates a voltage drop across resistors 278 and 286. The threshold voltage $V_{thresh}$ equals the voltage dropped across resistor 278 and transistor 270, as made available at node 282 by the PWM signal. Capacitor 290 filters the switching noise generated by the PWM signal from the threshold voltage $V_{thresh}$ so that the voltage is nearly constant. When the printer is activated, the digital controller 192 continuously monitors the temperature of the print head 38 and updates the duty cycle of the PWM signal to maintain a precise threshold voltage $V_{thresh}$. As explained below, the threshold voltage $V_{thresh}$ is compared to the thermistor 34 voltage to determine when the thermistor 34 has reached the threshold temperature.

Figure 6:
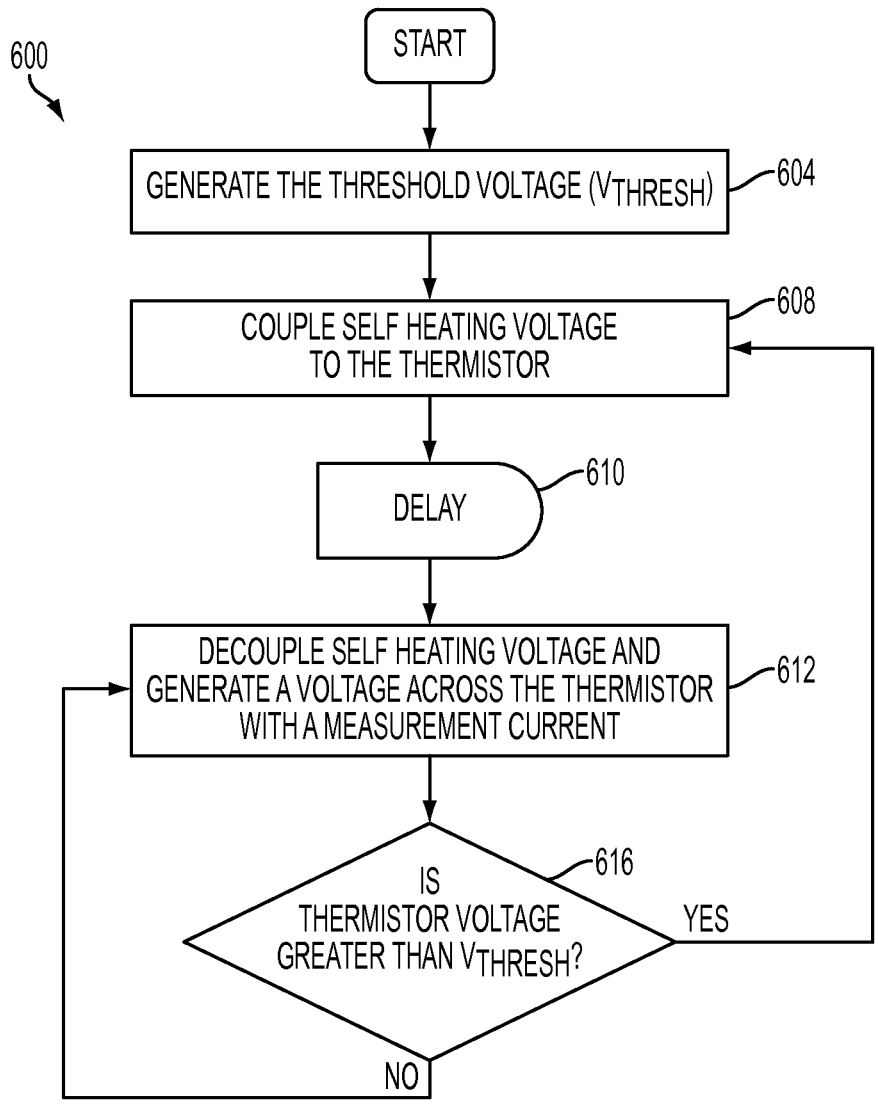
FIG. 6 depicts a flowchart illustrative of how a circuit implementing the ink level detection system heats a thermistor to a threshold temperature.

The flowchart of FIG. 6 illustrates a method 600 by which the ink level circuit 150 "self heats" the thermistor 34 and its leads to the threshold temperature. First, the digital controller 192 generates the threshold voltage Vthresh and applies the voltage to the negative input of the comparator 154 (block 604). Because the ink within the reservoir 58 and the ink level thermistor 34 are initially at the same temperature, the voltage dropped across the thermistor 34 is much greater than the threshold voltage Vthresh. Thus, initially, the positive input of the comparator 154 is coupled to a larger voltage than the negative input. Therefore, the open collector output of the comparator 154 enters a high impedance off-state, which allows resistor 188 to raise the voltage level at node 184 to the positive logic supply voltage 200, which may be +3.3 volts. The voltage at node 184 forward biases the base-emitter junction of the NPN transistor 196 and enables current to flow from the supply voltage 224 through resistor 212, the NPN transistor 196, and resistor 204 to electrical ground. The voltage at node 184, as determined by the positive logic supply voltage 200, is less than supply voltage 224 to ensure the base-collector junction of NPN transistor 196 is reverse biased. NPN transistor 196 and resistor 204 generate a voltage drop at node 208, which is less than the supply voltage 224. The voltage differential between node 220 and node 208 causes the base-emitter junction of the PNP transistor 172 to be forward biased. In normal operation, PNP transistor 172 is saturated when biased on and resistor 216 is of a relatively low value, such as 100 ohms, to enable node 160, which is the thermistor voltage, to be biased almost to the supply voltage 224. The limited voltage drop across resistor 212, 2.5 volts, for example, combined with resistor 216, prevents destructive current flow in the event of a short-circuit failure of thermistor 34. Therefore, resistor 216 and PNP transistor 172 couple a voltage to the thermistor 34 suitable to self heat the thermistor 34 and its leads (block 608), while limiting current in the event of a thermistor fault.

At predetermined periodic time intervals (block 610), the digital controller 192 interrupts the self heating of thermistor 34 and its leads by momentarily grounding node 184, thereby turning off transistors 196 and 172 (block 612). When transistor 172 turns off the thermistor 34 is no longer coupled to a heating voltage through low-impedance resistor 216. Instead, only a low measurement current flows through comparatively high-impedance resistor 164 and through the thermistor 34 (block 612). Specifically, resistor 164 may have a resistance of 2.49K ohms, which generates a current of 3 milliamps in the circuit of FIG. 4 once thermistor 34 reaches the steady state threshold temperature. The measurement current causes a voltage drop across thermistor 34 suitable for comparison with the threshold voltage $V_{thresh}$, and thus the current is herein termed a "measurement current." If the thermistor 34 voltage remains above the threshold voltage $V_{thresh}$, at the measurement current level, then the output of the comparator 154 remains in the high impedance off-state while the digital controller 192 momentarily grounds node 184, because the voltage level of the thermistor 34 indicates the temperature of the thermistor 34 and its leads are below the threshold temperature. Thus, after the digital controller 192 finishes momentarily grounding node 184, the node 184 quickly returns to the level of the positive logic supply voltage 200 causing transistors 196 and 172 to turn on once again, thereby heating the thermistor 34 with the self heating voltage (block 616). However, if after the digital controller 192 momentarily grounds node 184 the voltage dropped across the thermistor 34 is below the threshold voltage $V_{thresh}$, indicating the temperature of the thermistor 34 has exceeded the threshold temperature, the output of the comparator 154 enters the low impedance on-state while the digital controller 192 momentarily grounds node 184. Furthermore, even after the digital controller 192 finishes momentarily grounding node 184, the node 184 remains grounded by the low impedance output of the comparator 154, until voltage dropped across the thermistor 34 exceeds the threshold voltage $V_{thresh}$, indicating that the thermistor 34 has cooled to the threshold temperature (block 616). When the voltage dropped across the thermistor 34 equals $V_{thresh}$ the output of the comparator 154 enters the high impedance on-state, which once again heats the thermistor 34 and its leads by coupling the "self heating" voltage to the thermistor 34.

The process of heating and cooling the thermistor 34 and its leads in relation to the threshold voltage $V_{thresh}$ repeats indefinitely. Specifically, the circuit 150 causes the temperature of the ink level thermistor 34 to oscillate above and below the threshold temperature, with a range of approximately 0.02° C. Of course, the range is variable depending on the embodiment. When the temperature of the thermistor 34 has stabilized at the threshold temperature the ink level detection system is ready to perform an ink level measurement.

The ink level detection system determines the position of the surface level of the ink along the length of the conductor 94 and the thermistor 34 by counting a length of time power is delivered to the thermistor 34. The thermal conductivity of most inks is greater than that of air. Consequently, the heat loss and temperature drop in the thermistor 34 occurring during a period of time in which the thermistor is decoupled from electrical power is related to the length of conductor 94 and the thermistor 34 submerged in the melted ink within the ink reservoir. If the heat loss and temperature is small, the thermistor 34 and conductor 94 were exposed to more air than melted ink because the melted ink would operate as a more effective heat sink and pull more heat from the thermistor than the air does. By counting the amount of time required to return the thermistor to the threshold temperature, the controller is able to determine the position where the ink level contacts the electrical conductor/thermistor combination. Specifically, the ink level detection system determines the level of the ink on the conductor extending from the thermistor and the thermistor 34 by grounding the output stage of the comparator 154 for a first predetermined time, thereby causing the thermistor 34 to cool. Once the thermistor 34 and conductor extending from the thermistor cool, the circuit 150 once again heats the thermistor 34 to return the temperature of the thermistor to the threshold temperature. The digital controller 192 counts the heating time period as a length of time within a fixed measurement cycle that the thermistor 34 is heated. The length of the fixed measurement cycle is the sum of the first and second predetermined times. The counted length of the heating time period corresponds to the power required to maintain the thermistor 34 and the conductor extending from the thermistor at the threshold temperature. The ink level circuit 150 compares the heating time period to a range of stored values that are empirically determined. These values correspond to increments of an ink level along the length of the electrical conductor and thermistor between a "full" and a "low" or "out" level. If the heating time period corresponds to a "full" condition nothing more is done. If the heating time period corresponds to an ink level along the length of the conductor and thermistor, the ink level circuit 150 sends a signal to the printer controller indicating the ink level. The printer controller is then able to control the amount of ink delivered to the print head reservoir 58 from the main ink reservoir. The circuit 150 enables the printer controller to reduce the flow of replenishing ink as the ink approaches the full level or the printer controller may adjust the flow of replenishing ink with reference to the printing being performed by the printhead. The range of the ink level sensing provided by the circuit 150 significantly enhances the control that can be performed by the printer controller over the control enabled by a full/low indicating system.

Heating and cooling time values may be correlated to the fluid volume in the reservoir over the full range of the thermistor/conductor length, even if the reservoir height to volume change is non-linear. In some applications, calculated values may provide sufficient volume information accuracy. Applications requiring precise volume information may be established or confirmed by calibration. The number of heating and thermistor value readings in a measurement cycle may be one or any number, such as the 2 cycle method described above for simplicity. The number of desirable cycles may vary as applicable to the application and/or various operational states of fluid consumption and replenishment. Numerous factors may influence the number of measurement cycles. For example, fluid material properties, thermal stability of the reservoir, the ability to change the temperature of the fluid within the reservoir, signal noise levels, temperature of the incoming replenishment fluid, various ratios of simultaneous consumption and replenishment, required accuracy, and the like may operate to influence the number of measurement cycles.

At the full condition, the ink level covers most, if not all, of the exposed conductor 94 extending from the thermistor. As the ink level drops, the portion of the leads exposed to the air pocket cool more slowly than the portion of the leads still submerged in the ink. Consequently, as the ink level drops and more of the leads are exposed to the air pocket, the more the heating period decreases to heat the thermistor and its leads to the threshold temperature. That is, as a greater length of the leads is exposed to air, the less energy is required to heat the leads and the thermistor to return the thermistor to the reference temperature. The change in the heating period may be approximately linear over the range of the heating period from the ink level at the end of the thermistor bead to the ink level at the full condition. Regardless of linearity, the position of the ink level can be determined with reference to the length of the heating period compared against known test results. Because the rate at which the leads absorb heat may differ from the rate at which they dissipate heat, the threshold temperature for the circuit may be changed when a change in ink level direction is detected. For example, if the heating period decreases after a period of stability or of decreases, then the controller can determine that the ink level has reached an apex and is beginning to drop. The threshold may then be changed to reflect the heat absorption of the leads as the ink continues to drop. When the heating period begins to increase, the controller determines the ink level has begun to rise and the controller may adjust the threshold to reflect the heat dissipation of the leads into the ink. The rate of heat dissipation and heat absorption may be determined empirically.

Figure 7:
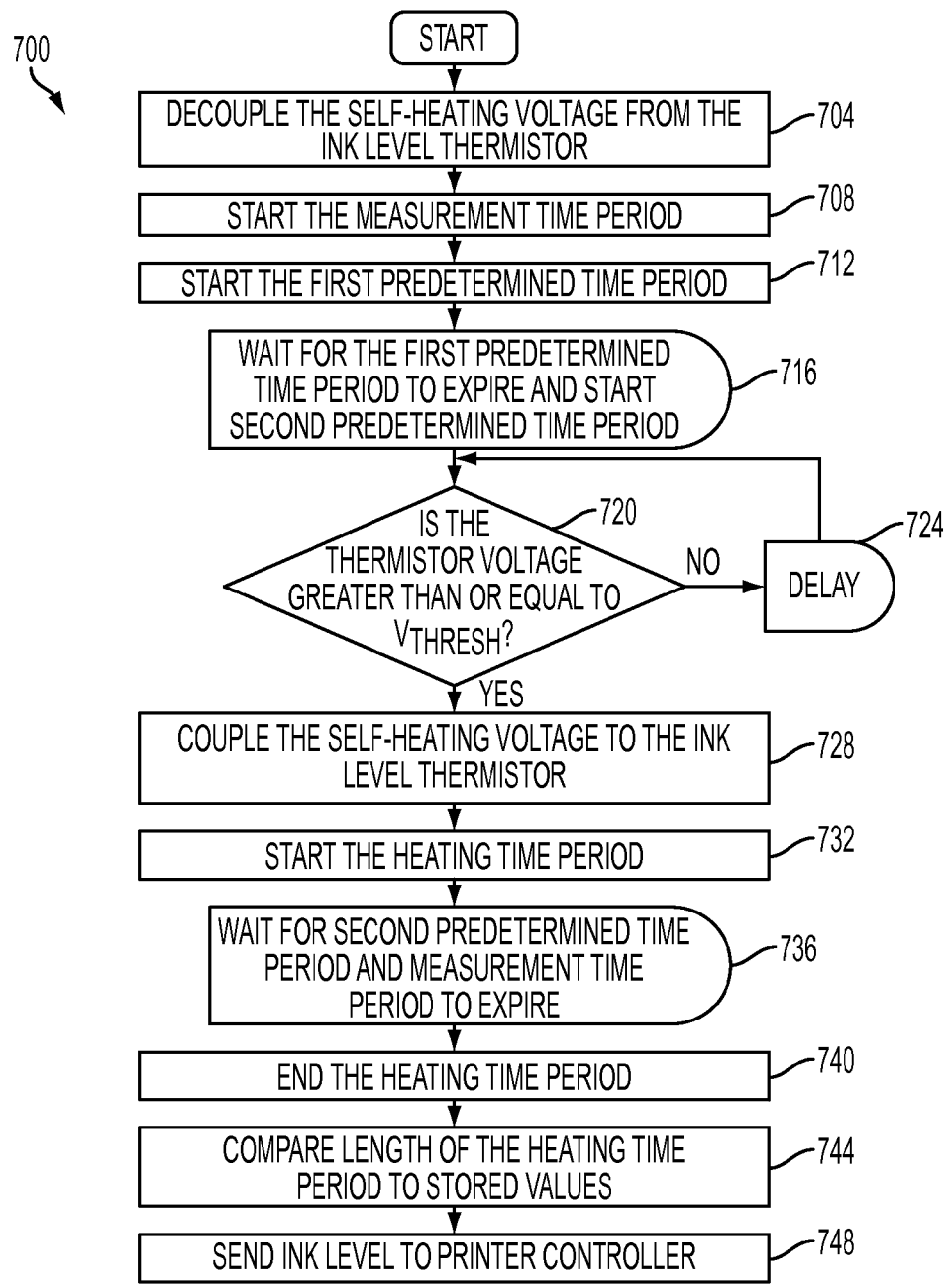
FIG. 7 depicts a flowchart illustrative of the method of detecting the ink level in an ink reservoir continuously along a length of an electrical conductor and thermistor.

The flowchart of FIG. 7 illustrates a method 700 by which circuit 150 of FIG. 4 detects the level of ink in a print head reservoir 58. Measurement cycles are initiated on a periodic basis, referred to as the measurement time period, which is the sum of the first and the second predetermined time periods. In one embodiment, the measurement time period may be two milliseconds; however, the length of the measurement time period depends on the circuit 150 components and the design of the printer. In the embodiment having a measurement time period of two milliseconds, the first predetermined time period is sixteen microseconds and the second predetermined time period is 1.984 milliseconds. The measurement time period represents a fixed time frame in which the digital controller 192 may successfully execute an ink level measurement. The results (heating time periods) from multiple, 200 for example, consecutive measurement time periods may be averaged together to reduce ink level measurement noise. Values in this example may be different at different operation states to accommodate system variations, as previously described, such as the temperature of incoming replenishment ink.

To begin the measurement cycle, the digital controller 192 grounds node 184 for a first predetermined time period, the beginning of which also marks the beginning of the measurement time period. When node 184 is grounded, transistors 196 and 172 enter cutoff mode, which prevents current from flowing through resistor 216 and PNP transistor 172. Thus the self-heating voltage is decoupled from the thermistor 34 causing the thermistor and its leads to cool (block 704). Thus, only the low measurement current flows through the thermistor 34. On the same clock cycle that the digital controller 192 grounds node 184, the controller starts counting the first predetermined time period and the measurement time period (blocks 708, 712). In one embodiment, the first predetermined time period may be approximately sixteen microseconds; however, other first predetermined time periods may be utilized depending on the type of thermistor 34, the magnitude of the supply voltage 224, the size of the reservoir 58, the position of the thermistor 34 within the reservoir 58, and the type of ink within the reservoir 58.

At the expiration of the first predetermined time period, the digital controller 192 releases node 184 from ground (block 716) and starts counting the second predetermined time period. If the first predetermined time period provided the thermistor 34 voltage sufficient time to exceed the threshold voltage $V_{thresh}$, the comparator 154 output enters the high impedance off-state almost immediately after the digital controller 192 releases node 184 from ground, thereby allowing the logic supply voltage 200 to turn on transistor 196 and saturate transistor 172 (block 720). When transistor 172 saturates, the voltage applied to node 160 to self heat the thermistor 34 causing its resistance to decrease (block 728). As soon as the comparator 154 enters the high impedance off-state the digital controller 192 starts counting a time period referred to as the heating time period, as explained below (block 732).

However, if the first predetermined time period did not provide sufficient time to allow the thermistor 34 voltage to exceed the threshold voltage $V_{thresh}$, the comparator 154 output remains in the low impedance on-state after the first predetermined time period has expired, which causes the transistors 196 and 172 to remain cutoff (block 720). Of course, when the transistors 196, 172 are cutoff only the measurement current is driven through the thermistor 34, thereby providing the thermistor 34 and its leads with additional time to cool (block 724). As the thermistor 34 continues to cool, the voltage dropped across the thermistor 34 continues to rise. When the thermistor 34 voltage reaches the threshold voltage $V_{thresh}$, comparator 154 enters the high impedance off-state, which causes the thermistor 34 to resume self-heating (block 720, 728). As soon as the comparator 154 enters the off-state, the digital controller 192 starts counting the heating time period (block 732).

The ink level detection system enables the heating time period to be used to determine the power required to heat the thermistor 34 to the threshold temperature. The beginning of the heating time period may be initiated in two situations. First, the heating time period may be initiated immediately at the expiration of the first predetermined time period, if the thermistor 34 voltage exceeded the threshold voltage $V_{thresh}$ during the first predetermined time period. The resulting "lengthy" heating time period usually indicates that a portion of the conductor 94 and the thermistor are submerged in ink. Specifically, more power is required to maintain the thermistor at the threshold temperature when the thermistor and the conductor extending from the thermistor are submerged in ink, because ink has a different, typically greater, thermal conductivity than air. A greater power requirement results in a longer heating time period. Second, the heating time period may be initiated when the thermistor voltage reaches the threshold voltage $V_{thresh}$ sometime after the expiration of the first predetermined time period. The resulting "shorter" power demand time period usually indicates a portion of the conductor 94 and the thermistor have been exposed to air above the ink level; therefore, less power is required to maintain the thermistor 34 at the threshold temperature.

To continue the discussion of the process in FIG. 7, the digital controller 192 correlates the heating time period to values stored in a memory to identify an ink level along the length of the conductor and the thermistor (block 744). For example, the controller may use the measured parameter as an index in a look-up table to identify the ink level. The table index values are correlated in the table to full and low ink levels and incremental level positions between full and low ink levels. Alternatively, a curve fitting technique may be used with empirically derived test data that correlates heating time period values to ink levels. The equation identified by this curve fitting technique may then be implemented with programmed instructions in the digital controller 192 to identify a position along the length of the conductor and thermistor and correlate that position to an ink level. The corresponding ink level detected from the heating time period values is then provided to the printer controller (block 748). The printer controller then uses the sensed ink level to regulate the replenishment of ink to the reservoir, if required. In another embodiment, the digital controller 192 records a predetermined number of heating time periods, and averages the heating time periods before comparing the length of the average heating time period to the stored values.

More broadly, the method described above dissipates power in a thermistor positioned in an ink reservoir, controls the dissipated power to maintain the thermistor temperature at a fixed differential above the reservoir temperature, measures a parameter that corresponds to the dissipated power, and compares the measured parameter to predetermined values to detect an ink level in the reservoir along a length of a thermistor and a conductor extending from the thermistor. In the described method, power is dissipated in the thermistor by coupling the heating voltage to the thermistor and the power dissipation is controlled by initiating the second predetermined time period on expiration of the first predetermined time period, comparing a voltage across the thermistor to a threshold voltage during the second predetermined time period, coupling the heating voltage to the thermistor upon detection of the thermistor voltage exceeding the threshold voltage during the second predetermined time period, and decoupling the heating voltage from the thermistor on expiration of the second predetermined time period. The power dissipation control and the monitoring of the thermistor voltage may occur concurrently or sequentially. The measured parameter in the described method is the heating time period, which is compared to the stored time parameters; although other parameters related to power dissipation may be measured. As described above, the parameter measurement and thermistor heating occur separately, although they could occur simultaneously. In such an embodiment, either the heating voltage source is configured to be a heating current source or the voltage measurement to identify the parameter value measures a thermistor current instead. The continuous range of ink level sensing is provided by the thermal conduction of the conductor extending from the thermistor and the thermistor.

The digital controller 192 contains error state protection to prevent the printer electronic controller from overfilling the reservoir 58 or letting the reservoir 58 run dry. For example, if the ink level thermistor 34 were to fail in the open state, current would not flow through the thermistor 34. Therefore, the circuit of FIG. 4 could not heat the thermistor 34 and the thermistor 34 voltage would be very great, i.e. almost reaching the supply voltage 224. Thus, the digital controller 192 would determine that the circuit 150 was unable to stabilize the temperature of the thermistor 34 probe assembly at the threshold temperature. If the thermistor 34 were to fail in the open state during an ink level measurement cycle, the voltage dropped across the thermistor 34 would not fall to the threshold voltage $V_{thresh}$, because the circuit 150 would be unable to heat the thermistor 34 resulting in a lengthy heating time period. To compensate for this type of failure, the digital controller 192 contains a maximum heating time period, after which the digital controller 192 indicates an error has occurred. If the digital controller 192 records more than a predetermined number of maximum heating time periods, the digital controller 192 sets an open thermistor flag, indicating to the printer controller that the thermistor 34 may not accurately indicate the ink level in the reservoir 58.

If the ink level thermistor 34 were to fail in the shorted state, the resistance of the thermistor 34 would be very low compared to its operational resistance level. As a result, the thermistor 34 voltage would be much lower than the threshold voltage. Therefore, even at the end of the measurement period the thermistor 34 voltage would not have reached the threshold voltage $V_{thresh}$, and the heating time period would not have been initiated. To compensate for this type of failure, the digital controller 192 includes a minimum heating time period. If the digital controller 192 records more than a predetermined number of minimum heating time periods, a thermistor 34 short flag is set, indicating to the printer controller that the thermistor 34 may not accurately determine the ink level in the reservoir 58.

The digital controller and thermistor probes may also provide information useful for controlling a printer warm up period. Given the fact that this ink level sense method is thermal in nature, it can also be used to provide feedback to the rest of the system about the behavior of the ink inside the reservoirs during warm up events. While a printer is off, ink remains in the solid state. During warm up, ink temperature lags the reservoir temperature as indicated by the signal from the reference thermistor 30 (FIG. 5). Level sense thermistors and the electrical leads to the thermistor that are within the reservoir can detect freeze/thaw transitions provided that they are in contact with the ink. This transition is manifested through instability of the level sense readings from measurement cycle to measurement cycle, but still within normal operational levels (i.e., neither shorted nor open). If thermistors are not in contact with ink, the measurement instability is minimal. Currently, printer software uses fixed timeouts that represent the necessary time coming out of each printer state (Low Power, Sleep, or Off) to sense the ink level in the print head reliably and make a determination with regard to adding new ink.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A method for monitoring an ink level in an ink reservoir comprising:
    dissipating heat in a thermistor positioned within an ink reservoir, the thermistor having an electrical conductor that extends from the thermistor, a length of the electrical conductor extending through and being exposed within at least a portion of the ink reservoir;
    providing electrical power through the electrical conductor to the thermistor to maintain the thermistor at a predetermined temperature that is a fixed differential above a temperature of the ink reservoir;
    measuring a parameter that corresponds to the heat dissipated from the thermistor and the length of the electrical conductor extending through and being exposed within the portion of the ink reservoir; and correlating the measured parameter to a predetermined value corresponding to an ink level in the ink reservoir to detect a position of the ink level in the reservoir continuously along the length of the electrical conductor and the thermistor.

2. The method of claim 1 wherein the provision of electrical power to the thermistor and the length of the electrical conductor enables the thermistor and the length of the electrical conductor exposed within the portion of the reservoir to reach a temperature that is a fixed differential above a temperature of the ink reservoir.

3. The method of claim 2, the provision of electrical power to the thermistor and the length of the electrical conductor exposed within the reservoir further comprising:
   initiating a first predetermined time period during which a measurement current is coupled to the thermistor through the electrical conductor;
   initiating a second predetermined time period upon expiration of the first predetermined time period;
   comparing a voltage across the thermistor to a threshold voltage during the second predetermined time period;
   providing electrical power to the thermistor and the length of the electrical conductor exposed within the reservoir upon detection of the thermistor voltage exceeding the threshold voltage during the second predetermined time period; and
   decoupling the electrical power from the thermistor and the length of the electrical conductor exposed within the reservoir upon expiration of the second predetermined time period.

4. The method of claim 3 wherein the measured parameter is a time period during which the electrical power is coupled to the thermistor through the electrical conductor.

5. The method of claim 3 further comprising:
   initiating the first predetermined time period upon the expiration of the second predetermined time period to form a periodic sequence of first and second predetermined time periods.

6. The method of claim 1, the measured parameter correlation further comprising:
   using the measured parameter as an index into a look up table to identify the ink level.

7. The method of claim 1, the dissipation of heat from the thermistor and the length of the electrical conductor exposed within the reservoir further comprising:
   detecting a temperature of the thermistor and the length of the electrical conductor exposed within the reservoir; and
   adjusting the dissipation of heat from the thermistor and the length of the electrical conductor exposed within the reservoir in response to a comparison of the detected thermistor temperature to the fixed differential above the temperature of the ink reservoir.

8. The method of claim 7 wherein the dissipation of heat from the thermistor and the length of the electrical conductor exposed within the reservoir and the detection of the temperature of the thermistor and the length of the electrical conductor exposed within the reservoir occur sequentially.

9. The method of claim 8, the detection of the temperature of the thermistor and the length of the electrical conductor exposed within the reservoir further comprising:
   detecting a voltage drop across the thermistor and the length of the electrical conductor exposed within the reservoir while a measurement current is flowing through the thermistor and the length of the electrical conductor exposed within the reservoir.

10. The method of claim 9, the adjustment of the dissipated heat further comprising:
    providing electrical power to the thermistor and the length of the electrical conductor exposed within the reservoir upon the detected voltage drop exceeding a threshold voltage; and
    decoupling electrical power from the thermistor and the length of the electrical conductor exposed within the reservoir at a subsequent predetermined time.

11. The method of claim 10 wherein the measured parameter that corresponds to the dissipated heat is a measured time period during which electrical power is coupled to the thermistor through the length of the electrical conductor exposed within the reservoir.

12. An ink level detection system for use in a printer comprising:
    a thermistor positioned with an electrical conductor within an ink reservoir of a printer, the electrical conductor being thermally exposed within the ink reservoir to enable the electrical conductor to dissipate heat into the ink reservoir;
    a switch configured to couple a voltage to the thermistor through the thermally exposed electrical conductor in response to a control signal being received at the switch;
    a comparator having one input coupled to a voltage across the thermistor and another input coupled to a threshold voltage, the comparator generating the control signal received by the switch; and
    a digital controller coupled to the comparator and configured to measure a parameter corresponding to a dissipation of heat from the thermistor and the thermally exposed electrical conductor during a predetermined time period and to correlate the measured parameter to a predetermined value that corresponds to an ink level in the ink reservoir to detect a position of the ink level continuously along a length of the thermally exposed electrical conductor and the thermistor.

13. The system of claim 12, the digital controller being further configured to ground the control signal electrically and turn off the switch for a first predetermined time period and, following expiration of the first predetermined time period, to measure a heating time period that commences in response to the voltage across the thermistor exceeding the threshold voltage and that terminates upon the expiration of a second predetermined time period, the second predetermined time period commencing in response to the first predetermined time period expiring, the heating time period being the measured parameter that corresponds to the dissipation of heat from the thermistor and the thermally exposed electrical conductor.

14. The ink level detection system of claim 13 further comprising:
    a reference thermistor, the reference thermistor configured to generate a voltage corresponding to an operating temperature of the ink reservoir; and
    the digital controller being further configured to generate the threshold voltage by converting a sum of a predetermined temperature differential and the operating temperature of the ink reservoir to a voltage.

15. The ink level detection system of claim 14 further comprising:
    a memory configured to store a plurality of known heating time periods; and
    the digital controller being further configured to use the measured heating time period as an index to identify a known heating time period stored in the memory to identify the position of the ink level continuously along the thermally exposed electrical conductor and the thermistor.

16. The ink level detection system of claim 12 wherein the measured parameter is a measured time period during which the voltage is coupled to the thermistor through the thermally exposed electrical conductor by the switch.

17. The ink level detection system of claim 16, the digital controller being further configured to average a predetermined number of measured time periods and to correlate the averaged time period to the predetermined value.

18. The ink level detection system of claim 12 further comprising:
   a second thermistor coupled to the ink reservoir to enable the second thermistor to detect an operating temperature of the ink reservoir; and
   the digital controller being coupled to the second thermistor and further configured to generate the threshold voltage with reference to the operating temperature by the second thermistor.

* * * * *